(12) United States Patent
Hellerman

(10) Patent No.: US 6,192,920 B1
(45) Date of Patent: Feb. 27, 2001

(54) CHAIN LINK FLOAT VALVE

(76) Inventor: Lance W. Hellerman, 3905 Marlowe, Houston, TX (US) 77005

( * ) Notice: Subject to any disclaimer, the term of this patent is extended or adjusted under 35 U.S.C. 154(b) by 0 days.

(21) Appl. No.: 09/500,049

(22) Filed: Feb. 8, 2000

(51) Int. Cl.[7] .............................. F16K 31/22; F16K 33/00
(52) U.S. Cl. .................. 137/430; 137/184; 137/192; 137/426; 137/451; 137/628; 251/210; 251/901
(58) Field of Search .................. 137/409, 426, 137/430, 433, 184, 192, 202, 451, 628, 432, 448; 251/210, 212, 294, 901

(56) References Cited

U.S. PATENT DOCUMENTS

| | | | | |
|---|---|---|---|---|
| 302,622 | * | 7/1884 | Coffee | 137/192 |
| 343,437 | * | 6/1886 | Cramer | 137/192 |
| 601,634 | * | 4/1898 | Cotter et al. | 251/901 |
| 934,045 | * | 9/1909 | Cotter | 137/451 |
| 1,269,048 | * | 6/1918 | Butcher | 137/451 |
| 1,576,709 | * | 3/1926 | Bassler | 137/202 |
| 1,840,441 | * | 1/1932 | Fina | 137/192 |
| 2,117,056 | * | 5/1938 | Dunn | 137/192 |
| 2,180,173 | * | 11/1939 | Share | 137/202 |
| 2,216,000 | * | 9/1940 | Crawford | 251/901 |
| 2,675,025 | * | 4/1954 | Wynkoop | 137/451 |
| 2,677,387 | * | 5/1954 | Crawford | 137/202 |
| 2,679,863 | * | 6/1954 | Tucker | 137/451 |
| 2,737,364 | * | 3/1956 | Handwerk | 137/192 |
| 2,977,972 | * | 4/1961 | Billeter et al. | 137/451 |
| 3,889,706 | * | 6/1975 | Wallin | 251/901 |
| 3,973,582 | * | 8/1976 | Siebold | 137/202 |
| 4,082,106 | * | 4/1978 | Butcher | 251/901 |
| 4,306,580 | * | 12/1981 | Wallquist et al. | 137/192 |
| 4,342,328 | * | 8/1982 | Matta | 137/433 |
| 4,621,945 | * | 11/1986 | Schafer et al. | 137/451 |
| 4,770,201 | * | 9/1988 | Zakai | 137/202 |
| 5,020,567 | * | 6/1991 | Proulx | 137/451 |
| 5,660,533 | * | 8/1997 | Cartwright | 137/202 |

* cited by examiner

*Primary Examiner*—George L. Walton

(57) ABSTRACT

A valve for maintaining a given level of liquid in a tank, reservoir, or other container having a liquid-gas interface. Said valve being actuated by a float that rises and falls along with the liquid in the container. Said valve float actuates a series of valves in sequence wherein the higher the float rises, the more valve ports are opened allowing a higher flow rate through the valve.

2 Claims, 2 Drawing Sheets

CHAIN LINK FLOAT VALVE

BACKGROUND OF THE INVENTION

1. Field of the Invention

The present invention relates to the use of a float actuated valve to maintain a given gas or liquid level.

2. Description of Prior Art

Float valves have been used for many years to control the liquid level in tanks and vessels and other liquid containing devices. The float valve typically consists of a containment vessel, an inlet port, a discharge port, a float attached to a valve fitting via an actuator arm, and a valve seat. The valve is actuated when the liquid level rises, forces the float up and opens the valve through movement of the actuator arm. These valves work by using the hydrostatic force of the float. The valves are limited in their pressure range since the force needed to actuate the valve becomes more than that available from the float as the pressure increases. The force required using a conventional float valve configuration for high pressure service would result in an excessively large, heavy containment vessel along with a large float and actuator arm.

SUMMARY

The invention is an application of a float actuated valve using multiple small valves employed in sequence to allow a relatively small float to provide the force required to open the valve even under high pressure. The opening of several small valves allows flow rates equivalent to a much larger valve.

DESCRIPTION OF THE DRAWINGS

The following drawings are provided to illustrate the application of the invention.

DESCRIPTION OF THE PREFERRED EMBODIMENT

Figure 1:
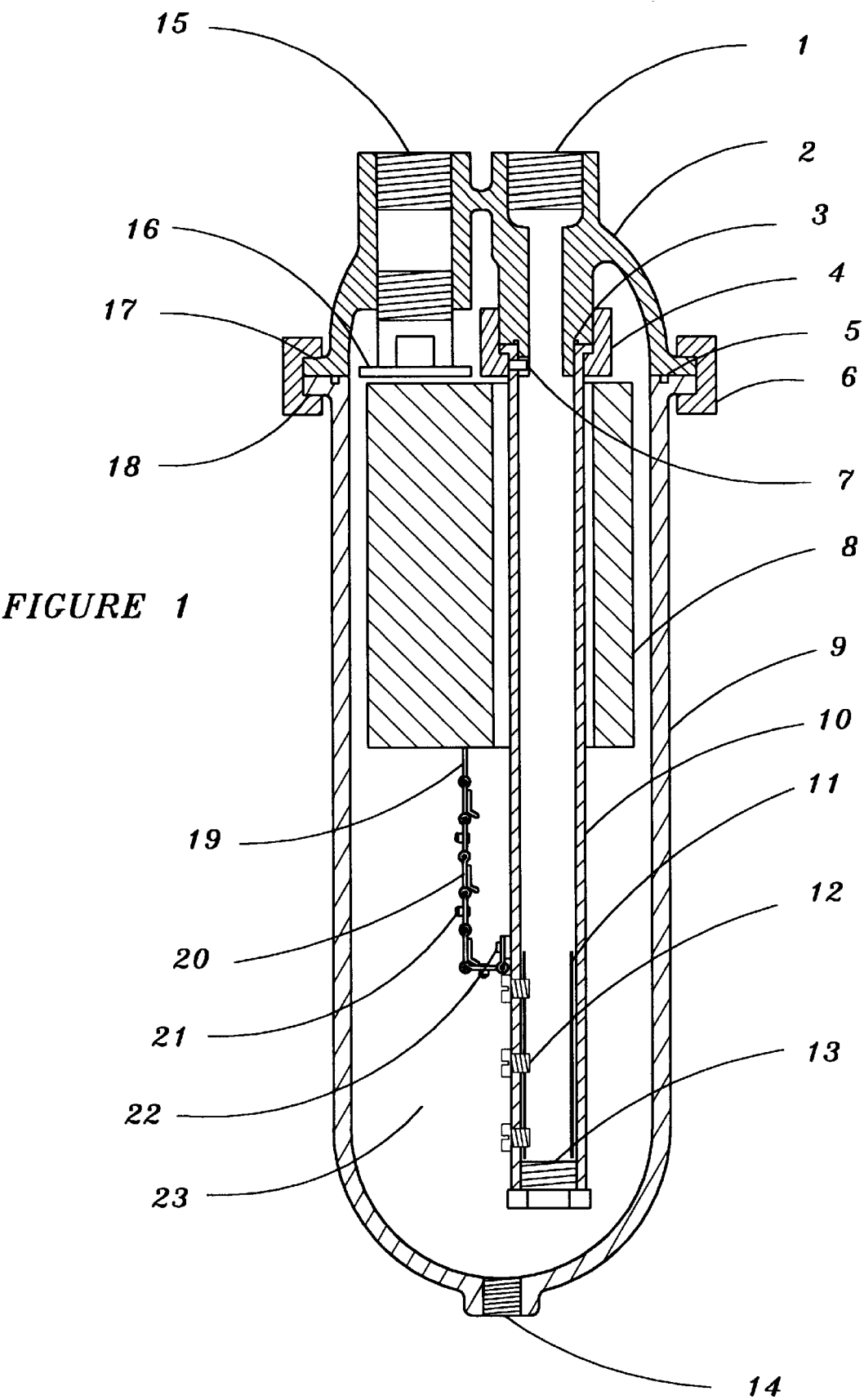
FIG. 1 is a section of the float valve assembly illustrating the arrangement of the components and the basic valve configuration.

The general configuration of the valve is shown in FIG. 1. In this view the float is shown fully elevated and all valve ports are open. Liquid flows into the valve assembly through the port in the cap, into the diffuser, and down to the holding bowl. As the bowl fills, the float moves up and sequentially opens the valve ports. When the valves open, the liquid flows into the discharge tube and out the top of the assembly. The individual components of the valve are as follows:

The cap assembly (2) serves as the support for the valve assembly, provides a means for liquid and gas to enter the valve through the inlet port (15), a means for liquid to flow from the valve through the discharge port (1), a support for a diffuser head (16), a support for the discharge tube (10), and a flange (17) for attaching the bowl assembly by means of a clamping ring (6). The diffuser head (16) is designed to prevent liquid from discharging directly onto the float (8) and disrupting the valve operation. The clamping ring (6) encircles the flange (17) of the cap assembly (2) and the flange (18) of the bowl (9). A gasket (5) is provided to make the flange (17) to flange (18) mating liquid and gas tight.

The bowl (9) provides the bottom containment for the valve assembly, allows the liquid to accumulate to a point where the float (8) moves up, and provides a guide for the float (8). The bowl (9) contains a drain hole (14) to allow pressure to be relieved prior to opening the assembly, to obtain liquid samples, and to drain the bowl (9) prior to disassembly.

The float assembly consists of a float (8), a chain link valve assembly consisting of valve stem links (21) and leverage links (20), a securing link (22) on the discharge tube (10) and a securing link (19) on the float. Three valve stem links (21) are shown but either more or fewer links can be used and still meet the valve requirements. The float (8) has a hole or slot, which will allow it to slide around the discharge tube (10). When the liquid level (23) in the bowl (9) is low, the float (8) is at the bottom of the bowl (9). In this position the chain link runs along the discharge tube (10) and the valve stems (21), are pressed into the valve seat plugs (12) by the pressure in the valve assembly thus sealing the liquid in the bowl. As liquid builds up in the bowl (9) the float (8) rises and progressively pulls the valve stems (21) away from the valve seat plugs (12) thus opening the valve assembly to liquid flow. The leverage links (20) provide a means of multiplying the buoyant force of the float (8). The valve seat plug (12) orifice and the leverage link (20) are sized to be consistent with the pressure and flow rating of the valve. An alternative configuration would consist of a leverage link and valve stem link combined into a single link.

The discharge tube (10) provides the exit path for the liquid going out of the valve. When the valve stem (21) is lifted off the valve seat plug (12), the liquid flows through the seat and into the annulus of the discharge tube (10). A wear barrier (11) is provided to prevent the jet created by liquid coming through the valve seat plug (12) from drilling through the discharge tube (10). The liquid then proceeds up through the annulus of the discharge tube (10) and out the discharge port (1). An access plug (13) is provided at the bottom of the discharge tube (10) to allow placement of the wear barrier (11), cleaning, and inspection. An alignment pin (7) is provided at the top of the discharge tube (10) to insure correct alignment of the valve seat plug (12) to the valve stem (21) and to prevent rotation of the discharge tube (10). The discharge tube (10) is held in place on the cap assembly (2) by a tubing nut (4). A liquid and gas tight seal is provided between the discharge tube (10) and the cap assembly (2) by using a gasket (3).

Figure 2:
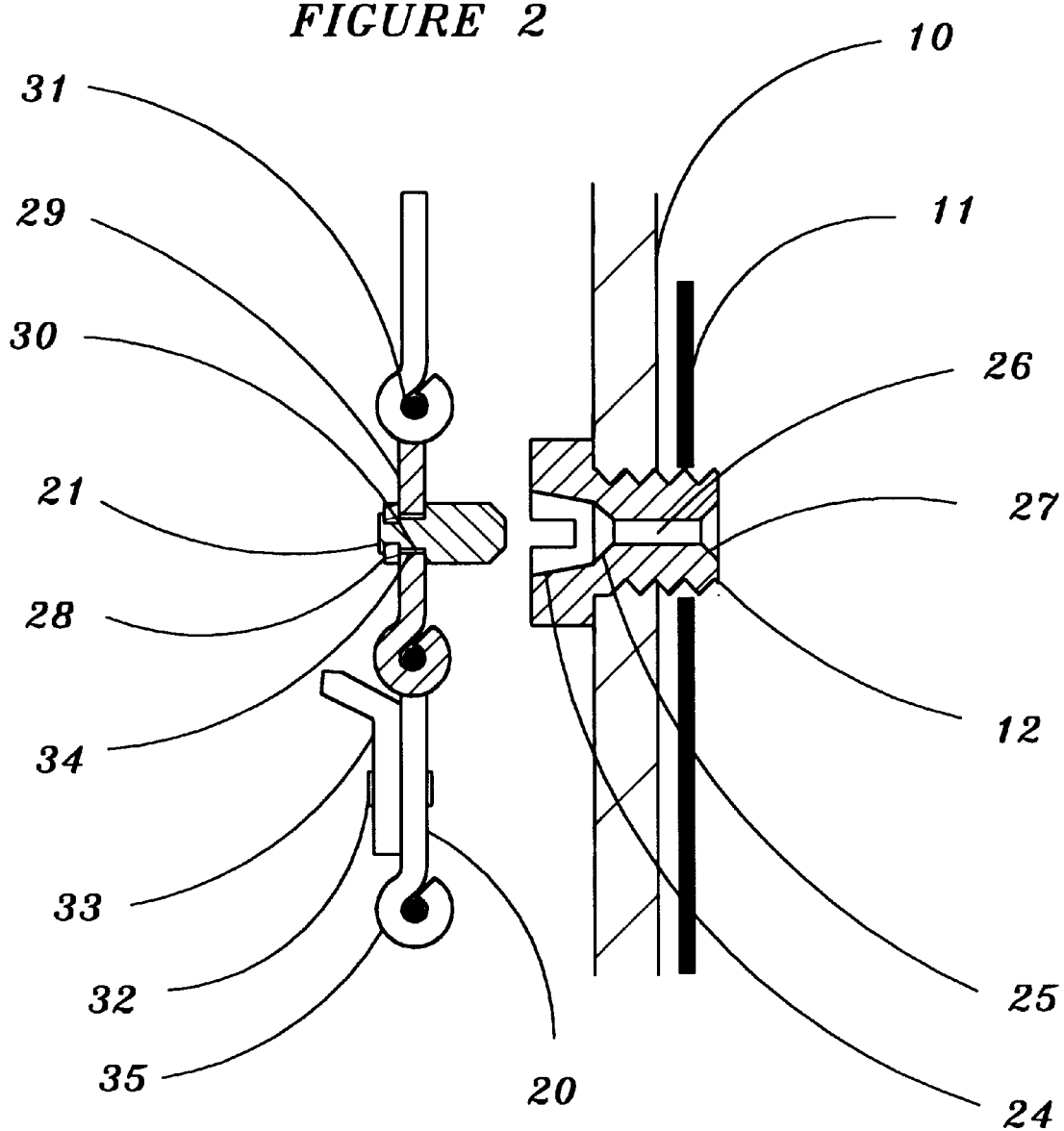
FIG. 2 is an enlargement of the valve stem area illustrating the method of providing tolerances for the valve stem to valve seat mating.

Further detail on the valve stem (21) and the valve seat plug (12) may be found on FIG. 2. The valve seat plug (12) contains a tapered portion at the inlet, called the alignment cone (24), to guide the valve stem (21) into the seat (25) against which the valve stem (21) can seal; a passage (26) through which the liquid flows into the discharge tube (10); and a tapered outlet (27) to introduce a fan shape to the liquid stream. The valve seat plug (12) threads into the discharge tube (10) so that different materials can be used for the two components. A separate valve seat plug (12) will allow replacement of the valve seats without replacing the entire discharge tube (10). Several different configurations are possible for the valve seat plug (12), the seat entrance (24), the seat (25), the seat discharge (27), as well as the method of fixing the valve seat plug (12) to the discharge tube (10). The valve seat plug (12) could also be machined directly into the discharge tube (10).

The valve stem (21) is designed to allow movement of the valve stem (21) independent of the position of the valve stem support (29). The valve stem support (29) contains an opening (34) which is somewhat larger than the valve stem neck (30). The valve stem (21) is attached using the shoulder on the neck to space the attachment washer (28) and allow the valve stem (21) to move around within the confines of the valve stem support opening (29). The valve stem (21) is therefore free to move slightly as required by the alignment cone (24) in the valve seat plug (12). A liquid tight seal can therefore be achieved more easily than with a rigidly attached valve stem. Depending upon the particular materials used and the liquids involved, a rigidly attached valve stem could possibly be used with success. The floating valve stem (21), however, will have a broader range of application. In some applications, a gasket or other flexible seal may be needed between the valve stem (21) and the valve seat (25).

The valve stem support (29) has a hinge joint (35) at each end to connect to the next section of the chain. A hinge pin (31) is provided to join the links. In most cases the valve stem support (29) will connect to a leverage link (20). The leverage link (20) consists of a base link (20) with a stop plate (33) riveted (32) or welded on top. The stop link (33) jams against the valve stem support (29) when the link has rotated approximately 90° to prevent further rotation, thereby applying the leverage necessary to pull the valve stem (21) from the valve seat plug (12).

Many similar configurations are possible. The valve may be used to stop or start flow at any given level by changing the attachment point of the chain links. The arrangement described represents the preferred configuration for the most common application.

It is understood that the present invention is useable in a broad range of applications. Many embodiments and adaptations of the present invention other than those described, as well as many variations, modifications, and equivalent arrangements will be apparent from or reasonably suggested by the present invention without departing from the substance or scope of the present invention. The foregoing is not intended to limit the present invention or otherwise exclude any such other embodiments, adaptations, variations, modifications and equivalent arrangements. The present invention is limited only by the claims appended hereto and the equivalents thereof.

I claim:

1. A regulating valve for maintaining the liquid level in a vessel, tank, or other container comprising;

a top outer containmnent bowl portion having an inlet port to allow liquid to flow into said bowl, an attachment port for an inlet flow dispersing deflector, an outlet port to allow liquid to flow out of said bowl, an attachment port for a discharge tube to direct liquid to said outlet port, and a common edge for attachment to a bottom outer containment bowl portion;

said discharge tube having a plurality of openings to allow communication between said outer containment bowl portions and said outlet port in the top outer containment bowl portion, said discharge tube having a fluid shield means disposed therein to reduce erosion of said discharge tube by inlet fluid flow;

a float, free to move within said outer containment bowl portions and disposed around said discharge tube, a fleible connector having a pair of ends, one end being attached to said float and the other end attached to said discharge tube, said flexible connector having means for sequentially opening and closing said plurality of openings in said discharge tube as said float moves along said discharge tube in response to changes in the liquid level in said outer containment bowl portions;

said bottom outer containment bowl portion being joined at a common edge with said top outer containment portion, having a means for sealing said top outer containment portion to said bottom outer containment bowl portion, and a port dispersed in said bottom outer containment portion for draining and relieving internal pressure prior to disassembly of said top outer containment bowl portion and said bottom outer containment portion; and wherein, said inlet flow deflector preventing flow from impinging directly on said float member.

2. A regulating valve as set forth in claim 1, wherein said openings being spaced along the length of said discharge tube are fitted with complementary valve seats, said valve seats having a tapered guide inlet portion to align a valve member and a tapered outlet portion to form a liquid spray of the liquid passing from the outer containment bowl portions into the discharge tube;

said internal fluid splash shield barrier means situated around the inner surface of said discharge tube, said internal splash shield being adjacent to said plurality of valve seats;

a removable inspection, cleaning, access and sealing plug at the bottom of said discharge tube;

an orientation alignment pin fitted between the top edge of said discharge tube and bottom of said outlet port in said top outer containment bowl portion; and a landing at the top edge of said discharge tube providing means for sealing said discharge tube to said top outer containment bowl portion.

* * * * *